May 14, 1929. J. CLAYTON 1,713,329
TENON CUTTING GUIDE BLOCK FOR SAW TABLES
Filed Dec. 17, 1927
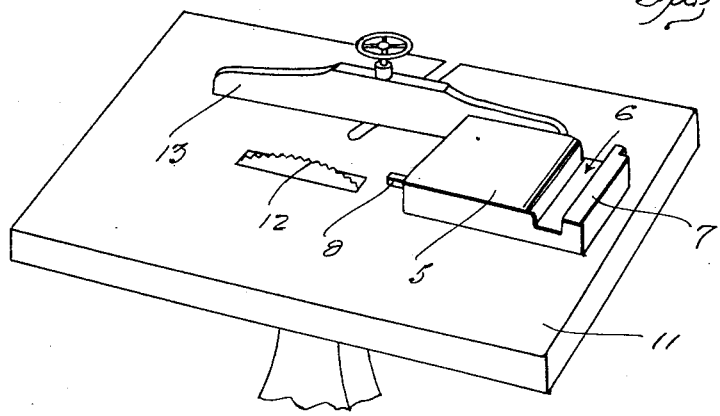
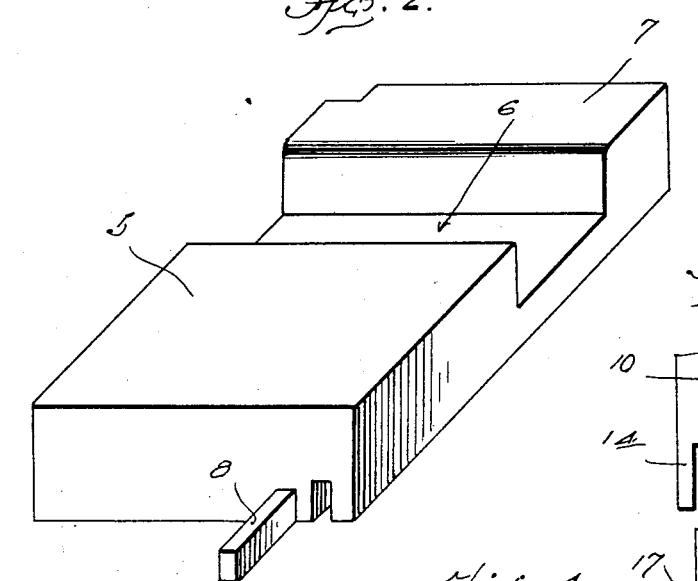
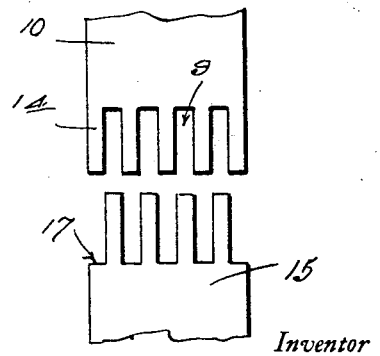
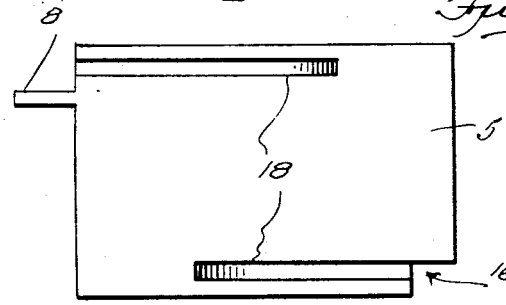
Inventor
John Clayton
By Clarence A. O'Brien
Attorney Patented May 14, 1929.

1,713,329

UNITED STATES PATENT OFFICE.

JOHN CLAYTON, OF PORT HURON, MICHIGAN.

TENON-CUTTING GUIDE BLOCK FOR SAW TABLES.

Application filed December 17, 1927. Serial No. 240,833.

The present invention relates to guide blocks adapted for use in connection with saw tables whereby to feed the work into cutting position with respect to the saw for the purpose of cutting a series of uniformly spaced tenons in the end of the work.

A further object of the invention is to provide a tenon cutting guide block of this character which may be used in conjunction with a saw table without necessitating any changes or alterations in the construction thereof, and which furthermore is of an extremely simple and practical construction, efficient in operation whereby to enable the row of tenons to be accurately cut, inexpensive to manufacture and otherwise well adapted for the purposes for which the same is intended.

Other objects and advantages reside in the special construction and combination of the various elements comprising the invention, reference being had to the accompanying drawings forming a part hereof, wherein:

Figure 1 is a perspective view of a saw table showing my tenon cutting guide block in operative position with respect thereto, Figure 2 is a perspective view of the guide block, Figure 3 is a fragmentary plan view of the end of the work showing the type of tenon adapted to be cut therein through the use of the block and Figure 4 is a bottom plan view of the block.

Referring now to the drawing in detail, my invention comprises a tenon cutting guide block indicated generally at 5 which is of a substantially rectangular formation, the upper surface of the block having a channel 6 extending transversely thereof whereby to form a relatively narrow strip indicated at 7 at one end of the block constituting a hand grip for the same during the operation thereof.

At the opposite end of the block is formed a projection 8 having its lower edge in a horizontal plane with the lower edge of the block and extending longitudinally from the end thereof.

When employing the guide block for use in cutting tenons of a type shown at 9 in the end of the material 10 as shown in Figure 3 of the drawing, the guide block is placed upon the saw table of conventional construction as shown at 11 above the upper surface of which protrudes the cutting edge of the saw 12 and adjacent to which is arranged the ripping guide 13. The guide block is disposed in a position as shown in Figure 1 of the drawings with one side thereof against the ripping guide 13 and a projection 8 extending in a direction toward the saw. In cutting the tenons with outside fingers on the edge of the work as indicated at 14 in Figure 3, the ripping guide is adjusted so that with the projection 8 disposed inwardly from the saw blade, a space is provided between the projection and saw equal to the width of the fingers and tenons desired to be cut. The work is then placed upon one lower end thereof abutting the outer side of the projection. The work may be held in the left hand of the operator while the guide block 5 is moved in a direction toward the saw by the right hand. It will be apparent that in this manner a tenon will be cut in the end of the work and in order to likewise cut each subsequent tenon in a uniformly spaced manner, the tenon last cut is placed over the projection 8 which it will be understood is formed of an exact size of the cut forming the tenon. By continuing the operation in this manner the entire end of the work will be provided with a row of uniformly spaced tenons.

In order to form the end of the work with companion tenons as shown at 15 for interfitting with the tenons in a manner as heretofore explained, and with the end tenons disposed inwardly from the edges of the work, the guide block 5 is turned around in a reverse position so as to bring the cut out corner 16 in a position adjacent the saw, and by facing the end of the work against the end of the guide block, with the edge of the work projecting the desired distance over the cutout portion 16, the edge of the work may be cut so as to form the shoulders 17 thereon rather than the fingers 14, without injuring the block 5. After the first cut has been made to form the shoulder 17 the block 5 is then reversed to its original position for cutting the remaining tenons as heretobefore described.

Suitable grooves 18 may be cut in the under surface of the block 5 in proper position with respect to the saw so as to prevent injury to the block as the same moves the work into cutting position with the saw and in order to enable the block to partly ride over the saw during the cutting operation.

Through the use of this tenon cutting guide block it will be apparent that a series of uniformly spaced tenons may be cut in the end of the work in an expeditious manner and by using only a single saw in place of a saw gang as customarily employed for this purpose.

It is obvious that the invention is susceptible of various changes and modifications, without departing from the spirit or scope of the invention or sacrificing any of its advantages, and I accordingly claim all such forms of the device to which I am entitled.

Having described my invention, what I claim as new is:

1. In a tenon cutting guide block of the class described, mounted for reciprocal movement upon a saw table and adapted to engage the work for guiding and feeding the same into cutting position upon the table, said block having a projection extending from the work engaging end thereof adapted to be introduced successively in the tenon last cut in the work and operating as a gauge for the cutting of subsequent tenons therein in a uniformly spaced parallel relation upon each succeeding movement of the block toward the saw.

2. In combination with a saw table of a tenon cutting guide block adapted for sliding movement upon the table, said block having a projection extending from one end thereof of a width equal to the tenon desired to be cut and adapted to be introduced within the tenon initially cut in the work whereby to secure the work in position with respect to the block for feeding the same against the saw for the purpose of cutting subsequent tenons in the work, said block also having a saw slot at its under side spaced from the projection a distance equal to the distance between the tenons and arranged to receive the saw at the completion of the cut whereby to prevent injury to the block.

3. In combination with a saw table of a reversibly mounted tenon cutting guide block adapted for sliding movement upon the table, said block having a projection extending from one end thereof of a width equal to the tenon desired to be cut and adapted for introduction within the tenon initially cut in the work whereby to secure the work in position with respect to the block for feeding the same against the saw for the purpose of cutting subsequent tenons in the work, said block also having a pair of saw slots at its under side, one of said slots being spaced from the projection a distance equal to the distance between the tenons and arranged to receive the saw at the completion of the cut whereby to prevent injury to the block and the other of said slots terminating in a cutout at the end of the block opposite from the projection and adapted upon reversal of the block to provide for the initial cutting of a shoulder at the edge of the work preceding the cutting of the tenons inwardly from the edge thereof.

In testimony whereof I affix my signature.

JOHN CLAYTON.